United States Patent [19]

Richmond et al.

[11] Patent Number: 4,625,202

[45] Date of Patent: Nov. 25, 1986

[54] APPARATUS AND METHOD FOR GENERATING MULTIPLE CURSORS IN A RASTER SCAN DISPLAY SYSTEM

[75] Inventors: Scott C. Richmond, Mulino; James R. Peterson, Portland, both of Oreg.

[73] Assignee: Tektronix, Inc., Beaverton, Oreg.

[21] Appl. No.: 483,353

[22] Filed: Apr. 8, 1983

[51] Int. Cl.[4] .............................................. G09G 1/16
[52] U.S. Cl. ..................................... 340/709; 340/707; 340/734
[58] Field of Search ............... 340/707, 708, 709, 710, 340/734

[56] References Cited

U.S. PATENT DOCUMENTS

| | | | |
|---|---|---|---|
| 4,354,184 | 10/1982 | Woborschil | 340/709 |
| 4,367,465 | 1/1983 | Mati et al. | 340/707 |
| 4,370,645 | 1/1983 | Cason et al. | 340/709 |
| 4,386,410 | 5/1983 | Pandya et al. | 340/726 |
| 4,404,554 | 9/1983 | Tweedy, Jr. et al. | 340/726 |
| 4,417,239 | 11/1983 | Demke | 340/709 |

*Primary Examiner*—Marshall M. Curtis
*Attorney, Agent, or Firm*—Terrence Meador; John P. Dellett; Robert S. Hulse

[57] ABSTRACT

An apparatus and a method for generating cursors in a multi-dimensional graphics display system uses line definition signals, each of which is representative of where along the horizontal display dimension one or more scan lines intersect a cursor to be presented. The apparatus includes a line definition memory for providing one or more line definition signals, and a line definition pointer circuit which responds to a scan line location by the vertical dimension, for selecting the line definition signal representative of the scan line. A generation circuit provides a cursor video signal at each horizontal location, as indicated by the selected line definition signal, where the represented scan line intersects the cursor to be presented.

13 Claims, 6 Drawing Figures

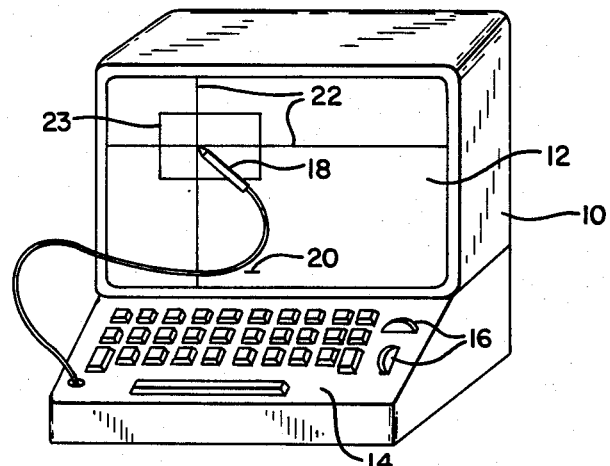
FIG. 1
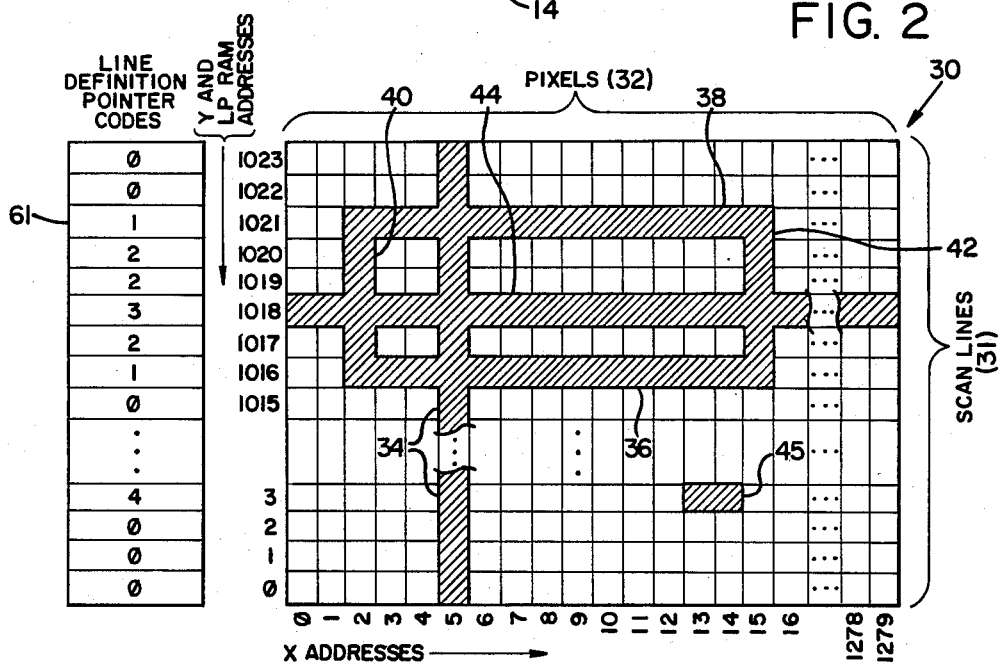
FIG. 2
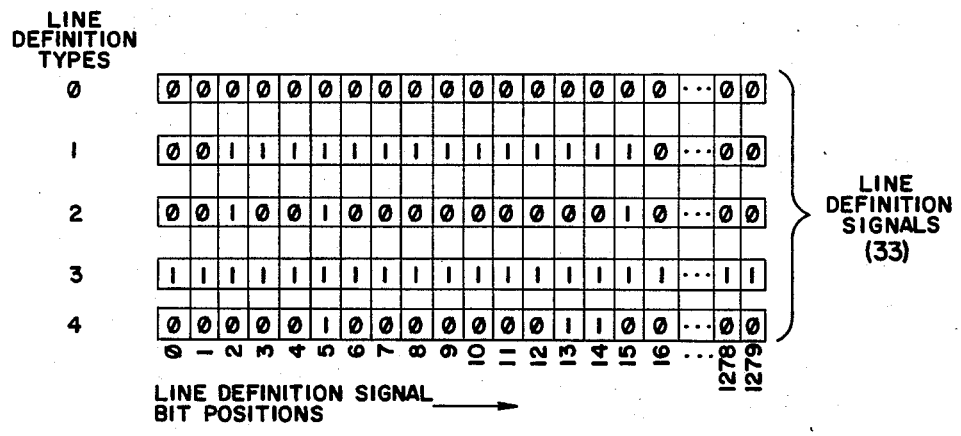

APPARATUS AND METHOD FOR GENERATING MULTIPLE CURSORS IN A RASTER SCAN DISPLAY SYSTEM

BACKGROUND OF THE INVENTION

The present invention relates to raster scan display systems, and particularly to an apparatus for generating one or more mobile cursors in such a system.

The operation of a graphics display system is enhanced by the provision of electronically generated cursors, one or more of which may be positioned on the display to identify part of a displayed image which a user wishes to alter in some way. For example, many systems provide a mobile alpha-numeric cursor with textual material to indicate a portion of text which is to be changed by the addition or deletion of alpha-numeric characters. In non-textual graphic images, other cursors may be used. A rectangular box may identify an image area to be panned or zoomed. Present systems may generate a number of different mobile cursors which enable a user to perform a variety of editing tasks on a displayed image.

In display systems incorporating analog television, cursors are generated by using electronic counters to calculate cursor dimensions and locations and insert their representative components into the video signal at the proper moment. The counters employ clock circuits which must be periodically synchronized with the generation of the television image. Between synchronization, the operational frequencies of the counting and the image generation circuits may drift apart, which can cause error in the location of the cursor and blur its outline. Rausch U.S. Pat. No. 3,778.058 Bushnell U.S. Pat. No. 3,793,483 exemplify this type of cursor generation system.

More modern raster-scan display systems produce clock pulses which are precisely phased with image display circuitry. Consequently, in these systems a cursor generator which utilizes a counting apparatus to position and draw a cursor can be inherently more accurate than the older analog systems. Doornink U.S. Pat. No. 4,190,834, for example, describes a circuit for producing a cross-hair cursor in synchronization with a raster-scan display. However, circuits of this type are not flexible enough to generate a large number of cursor types. If more cursors are required, the circuit must be expanded, or other circuits, dedicated to specific types of cursors, must be provided. The undesirable result is the proliferation of cursor generation circuitry. Therefore, it would be advantageous to have an apparatus which accurately generates a variety of cursors with a minimum of circuitry.

One approach to providing flexible, accurate cursor generation in a raster-scan graphics display would be to incorporate a separate cursor computation apparatus, including a dedicated cursor refresh storage buffer, into the display circuitry of the system. The output of the cursor buffer would be combined with that of the graphics image refresh buffer to produce a graphics image with the desired cursor symbols. However, as is well understood by those skilled in the art, provision of a separate buffer could involve the dedication of over 800K bits of random-access memory resulting in added system cost and complexity.

On the other hand, addition of cursor information into the image refresh storage buffer can affect the image information stored therein and further complicate access to it.

It is then evident that a need exists for an apparatus which will generate a variety of accurately drawn cursor symbols in a graphics display system without adding significantly to its hardware requirements or costs and without affecting its operation.

SUMMARY OF THE INVENTION

Since many cursor symbols are simple images having symmetrical, relatively slowly-varying shapes, they may be easily presented in a scanned video format by repeatedly displaying one defined portion of the video display which contains the same parts of the cursor image as other similarly defined portions. In a raster-scanned system, for example, the same part of a cursor shape may be repeated, without any change, for a great many scan lines. Thus, one scan line may be sufficient to provide image information for many scan lines containing identical parts of the image. The apparatus of the invention takes advantage of this fact by providing a definition signal representative of one or more defined portions of a display which contain identical parts of one or more cursors which are to be presented. Thus, a number of definition signals may be stored, each to be retrieved when one of the display image portions it represents is to be generated. Since a stored definition signal can represent more than one portion of the video display, the technique produces the unexpected but desirable result of requiring less storage space for cursor generation than would be necessary for a standard video refresh storage buffer.

As is understood by those skilled in the art, a graphics display system involves displaying computer-generated images on a display device such as a cathode ray tube (CRT). One known method of image formation comprises the generation of a raster-scan display which presents a desired image on a CRT by the generation of a plurality of sequential, mutually-parallel scan lines. Each scan line is positioned relative to the others in a vertical, "Y," direction and extends across the CRT screen in a horizontal or "X" direction. All lines are subdivided into an equal number of equally-spaced divisions which are called "pixels." The system generates an image by controlling the intensity of the CRT's electron beam as it scans the display screen in the pattern of scan lines, producing an image which is formed of a plurality of individual pixels. Typically, each scan line of a raster-scan system is assigned a unique designation or "Y address." Similarly, the sequential divisions of each scan line are assigned respective "X addresses" such that each pixel bears the X address of identically-positioned pixels in all other scan lines.

In this invention, a definition signal is provided which represents all scan lines which intersect cursor symbols at identical X address locations. Thus, cursor pixels may be produced for a display system scan line by selecting a definition signal corresponding to that scan line and generating a cursor video signal when the X address of the scan line corresponds to a pixel location, as represented by the selected definition signal, where a cursor occurs. Consequently, the total memory space required to store the definition signals for selection is substantially less tnan would be required by, for example, a dedicated cursor refresh buffer which would store every scan line.

In accordance with this invention, an apparatus is provided for generating cursors in a multi-dimensional display system, each dimension having a range of addresses corresponding to locations therein. Cursor image presentation is accomplished by providing definition signals, each representative of locations along a first of those dimensions where a cursor occurs. In response to an address representing a location in the other dimension, a definition signal corresponding to that address is selected and a cursor signal is generated when an address in the first dimension corresponds to a location, as represented by the selected definition signal, where a cursor occurs.

More particularly, in a raster-scan display system, a processor produces definition signals which are stored in a line definition random-access memory. The processor also produces pointer information mapping each scan line address to a respective definition signal, the information being stored in a line pointer random-access memory. Thus, when the scan line address increments, indicating beginning of a line, the line pointer random-access memory responds to the new line address by selecting a corresponding line definition signal. Finally, the selected definition signal is read out of the line definition random-access memory in synchronism with the projection of the corresponding scan line on the display so that when an X address along that scan line corresponds to a location, as represented by the selected definition signal, where a cursor occurs, a cursor video signal will be generated.

The method of the present invention includes steps directed to the provision of definition signals representative of locations along a first display dimension where a cursor occurs, the selection of a definition signal corresponding to an address and the second display dimension, and generation of a cursor signal when an address in the first display dimension corresponds to a location, as represented by the selected definition signal, where a cursor occurs.

It is therefore a principal objective of the present invention to provide a novel apparatus and method for generating multiple cursors in a graphics display system.

It is a further objective to provide in a graphics display system, an apparatus for generating one or more cursors without the need for a dedicated graphics image refresh buffer.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 illustrates the screen of a typical graphics display system on which representative cursors are to be generated.

FIG. 2 is a simplified representation of an enlarged section of the screen of a graphics display system according to the present invention illustrating the raster-scan technique of cursor symbol presentation together with line definition signals and associated pointer codes used in the invention.

DETAILED DESCRIPTION OF THE INVENTION

Figure 3:
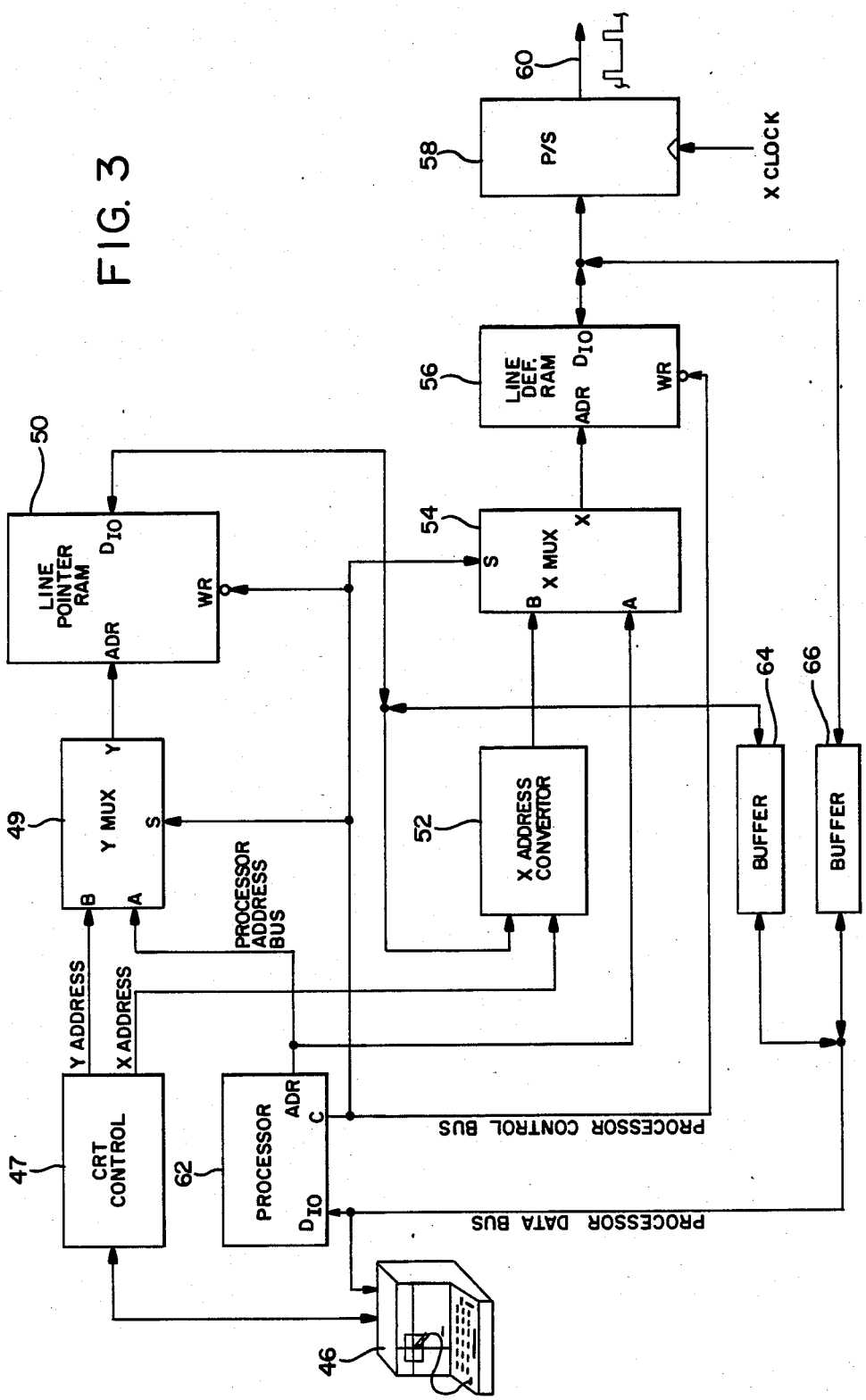
FIG. 3 is a simplified block diagram of the cursor generation apparatus of the invention.

Referring to FIG. 1, a digital graphics display system 10 comprises a display device such as a cathode ray tube upon which graphic images and cursors are presented. As is known in the art, the system typically comprises a computerized display section, not shown, which includes a graphics computation device for computing information necessary for graphical display of an image, a display refresh storage buffer which stores a digital representation of the image to be displayed and permits periodic updating of the displayed image, and a raster-scanned CRT device having a screen 12 upon which is produced a visual display of the graphical image comprised of a two-dimensional array of pixels arranged as described hereinabove.

The graphics computation device which generates the information necessary to display the image can include a cursor symbol computation section which produces and processes information necessary for presentation and manipulation of cursor images on the CRT screen 12. Such a device receives symbol selection and manipulation signals from cursor graphics input devices such as a keyboard 14, a set of thumbwheels 16, and an electronic stylus 18. This information enables the graphics computation device to compute data relative to the type of cursor selected such as its shape and size. The device also calculates the present position of a cursor as well as its path of movement to a different location. The operation of a display system possessing these capabilities is described in the Operator's Manual for the Model 4112 computer display terminal manufactured by Tektronix, Inc., Beaverton, Ore.

A tableau of representative cursor symbols is presented on the CRT screen 12. An alpha-numeric cursor is indicated by 20, a set of orthogonal crosshairs by 22, and a framing rectangle by 23. It is to be understood that these three cursors are representative and are presented only for the purpose of illustrating the operation of the embodiment, and are not intended as a limitation thereto. Reference to FIG. 2 illustrates how these cursors are generated by the apparatus and method of the preferred embodiment of the invention.

As illustrated in FIG. 2, wherein an enlarged section, indicated by 30, of the tableau illustrated in FIG. 1 is presented, the raster display area of the CRT screen 12 may be divided into 1,024 scan lines 31, with each line divided into 1280 individual pixels 32. In the preferred embodiment, each scan line is assigned a Y address corresponding to its numerical position, and each pixel of each line is similarly assigned an X address corresponding to its location in the sequence of pixels which composes the line. Thus, the screen 12 is two-dimensional (having an X and a Y dimension) although this is not intended to preclude the application of the present invention to display systems comprising more or fewer dimensions.

If, as is known, the cursor images were to be kept in a cursor refresh storage buffer, space for all 1,024 scan lines would have to be provided. However, the provision by the invention of line definition signals which can represent more than one scan line for the purpose of image generation significantly reduces the total memory resource which must be devoted to cursor image presentation.

In the invention, line definition signals 33 are provided, each of which represents the pixel locations along the horizontal or X dimension of one or more scan lines where a cursor occurs. Viewed differently, a line definition signal represents the points of intersection in the X dimension where one or more scan lines intersect a cursor that is to be generated. It is evident that one line definition signal may represent more than one scan line. For example, the scan lines bearing the Y addresses 0-2, 4-1015, and 1022-1023 all intersect only the vertical line 34 of the crosshairs cursor at the pixel location having X address 5. These scan lines can be represented by a single line definition signal having the format of a scan line and containing cursor information at its X address location where the represented scan lines intersect the vertical line 34; this line definition signal is shown in FIG. 2 and is designated as line definition type 0.

In the preferred embodiment, a line definition signal has the same format as a scan line and it comprises a digital signal 1,280 bits in length. The bits are sequentially ordered and assigned numbers corresponding to the X addresses of the identically situated pixels in the scan lines represented by the signal. A digital "1" is entered into the bit positions which correspond with pixel locations where a represented scan line intersects one or more cursor symbols. A digital "0" is entered in all other bit locations. Thus, a number 1 is entered in a bit position 5 of line definition signal 0 which is indicative of the location where every represented scan line intersects the vertical line 34, that is, X address 5.

Similarly, line definition signal type 1 represents scan lines 1016 and 1021 which intersect the bottom and top sides, 36 and 38 respectively, of the rectangular cursor 23. Line definition signal type 2 corresponds to scan lines 1017, 1019, and 1020 which cross the vertical sides 40 and 42 of the rectangular cursor and the vertical line 34. The scan line having the Y address 1018 contains the horizontal line 44 of the crosshair cursor and is represented by line definition signal type 3. Finally, line definition signal type 4 corresponds to the scan line having Y address 3, which crosses both the vertical line 34 and the alpha-numeric cursor 45.

With reference now to FIG. 3 as well as FIG. 2, the use of line definition signals in the operation of the preferred embodiment of the invention can be better understood. A graphics display system 46 corresponding to the device illustrated in FIG. 1 and described hereinabove, typically has in its display generation circuitry a CRT control circuit 47 which produces a variety of signals for synchronizing the generation of the raster-scan image. As is known, such a circuit provides the Y addresses of the scan lines in a regulated sequence corresponding to that in which the lines are presented on the CRT screen. In the preferred embodiment, the Y addresses are produced cyclically beginning with 1,023 and decrementing therefrom. As 1,024 lines must be designated, each Y address comprises a 10-bit binary digital word which is conducted on a Y address signal path comprising 10 parallel lines. Similarly, X addresses of 11 bits each are produced by the CRT controller 47 in the same sequence as and at the same rate with which corresponding pixels are generated on the display screen.

The Y addresses are coupled to the input port B of Y multiplexer 49, the output port Y of which is connected to the address input ADR of a line pointer random-access memory (LP RAM) 50. Information provided from the data port ($D_{IO}$) of the LP RAM 50 is combined with a portion of the X address output of the CRT controller 47 in an X address converter circuit 52, which is described in greater detail hereinbelow. The output of the converter circuit 52 is connected through the input port B of X multiplexer 54 to the address input ADR of a line definition random-access memory (LD RAM) 56. The $D_{IO}$ port of the LD RAM 56 is connected to a parallel-to-serial converter (P/S) 58 which provides a cursor video signal output 60.

Although not necessarily required for generation of cursors, the embodiment of FIG. 3 preferably includes a microprocessor 62 having a data port ($D_{IO}$) connected to receive cursor size, shape, and location information from the graphics display system 46 for production of line definition signals and of line pointer codes. The $D_{IO}$ port is also connected through buffer 64 to the $D_{IO}$ port of the LP RAM 50, and through buffer 66 to the $D_{IO}$ port of the LD RAM 56. The processor's address output ADR provides inputs to the input ports A of the Y multiplexer 49 and the X multiplexer 54. Finally, signal paths extend from the processor control output C to the inputs S of the Y multiplexer 49 and X multiplexer 54 for selection of an address source, and to the write enable input WR of the RAMS 50 and 56. As is explained hereinbelow, the processor switches the multiplexer outputs to their A inputs only when line definition signals and pointer signals are to be entered into the RAMS. At all other times, the processor keeps the multiplexer outputs switched to their B inputs.

In operation, line definition signals are provided for cursor generation by the LD RAM 56. The signals, which may be produced by an appropriate source such as processor 62, are entered into the LD RAM 56 through its $D_{IO}$ port. In the preferred embodiment, each line definition signal is stored in the RAM 56 in 80 separate, sequentially addressable storage locations which are 16 bits in length. Each RAM address therefore defines a unique 16-pixel segment of a line definition signal. The total LD RAM storage space is a matter of design choice, however, it must be sufficient to store all of the possible line definition signals.

When the line definition signals are entered into the LD RAM 56, pointer signals relating each definition signal to the scan lines which it represents are entered into the LP RAM storage space (represented by 61 in FIG. 2) in the order illustrated. In the preferred embodiment, the LP RAM comprises at least 1,024 separately addressable storage locations. Each location address is the equivalent of the Y address of a scan line. Thus, Y addresses provided by the control circuit 47 will sequentially access the locations in the LP RAM. Each addressable location contains a pointer signal comprising the code of the line definition signal type which represents the scan line associated with that location's address. This arrangement enables the LP RAM to respond to a Y address by selecting the pointer code of the line definition signal which represents the scan line associated with that Y address.

When one of the line definition signals stored in the LD RAM 56 has been selected by the LP RAM 50, the selection being indicated by the provision of a pointer code therefrom, a generating circuit comprising the address converter 52 and the P/S converter 58 provides a means for using the selected line definition signal to generate a cursor video signal. The cursor video signal is generated synchronously with the presentation of the graphics image video signal so that a composite image may be presented on the CRT screen with the cursor symbols in their desired locations. This is accomplished by providing a selected line definition pointer code to the X address converter 52 together with the seven most significant bits of each X address. The converter uses these inputs to calculate an LD RAM address location according to the following expression:

$$LD\ RAM\ address = (N \times 80) + X/16 \quad (1)$$

where LD RAM address is the calculated address of a specific 16-bit sector of the memory space in the LD RAM 56 and N is the pointer code provided from the LP RAM 50. The term $X/16$ is the current X address divided by 16, disregarding any remainder, which is implemented in the invention by providing the seven most significant bits of the current X address from the CRT control circuit 36. While the terms of equation (1) are expressed in base 10 format, the converter performs the operation in base 2 and provides the LD RAM address in a binary digital signal format.

In effect, the portion of the address defined by the first term of equation (1) identifies the beginning of an 80-word long storage sector in the RAM 56 where a selected line definition signal is stored. This synchronizes the selection of a line definition signal with the generation of each scan line which it represents. The second term of equation (1) which is derived from the seven MSB's of the X address will increment the least significant portion of the LD RAM address once for each group of 16 successive X addresses. The portion of the selected line definition signal contained in the storage segment which is accessed by the current calculated LD RAM address comprises the 16 bits of the selected signal which correspond with the 16 X addresses which will occur before the LD RAM address is next updated. These 16 bits are provided in a serial stream which is synchronized by the P/S converter 58 with the associated 16 address sequence.

The 16-bit long line definition segment is entered into the converter 58 concurrently with the change of state of the previous LD RAM address so that, when the first X address of the next sequence of 16 addresses occurs, the first bit of the 16-bit segment will be provided as an output from the converter. The serial bits output by the converter are synchronized with the production of X addresses by provision of an X CLOCK signal whose frequency is equal to that of the occurrence of X addresses. Thus, the converter 58 outputs a sequence of digital bits which correspond to the bits of a selected line definition signal and which occur in synchronism with the associated X addresses. The serial output of the converter therefore provides an indication (that is, a digital "1") of where, in the X dimension, as indicated by the line definition signal, the portions of a cursor intersected by the represented scan line occurs. This is termed a "cursor video signal."

For the generation of cursor symbols by the video projection circuitry of the display apparatus 46, the output of the P/S converter 58 may be logically combined by any selected operation with the output of the image refresh storage buffer, the combination being provided to the CRT projection circuitry for presentation on the CRT screen.

While cursor video signals are generated by reading a selected line definition signal out of the LD RAM 56 in 16-bit segments, it will be evident that a line definition signal can be extracted from any memory device in larger or smaller segments according to the demands of a particular system in which the apparatus of the invention may be implemented.

Figure 4:
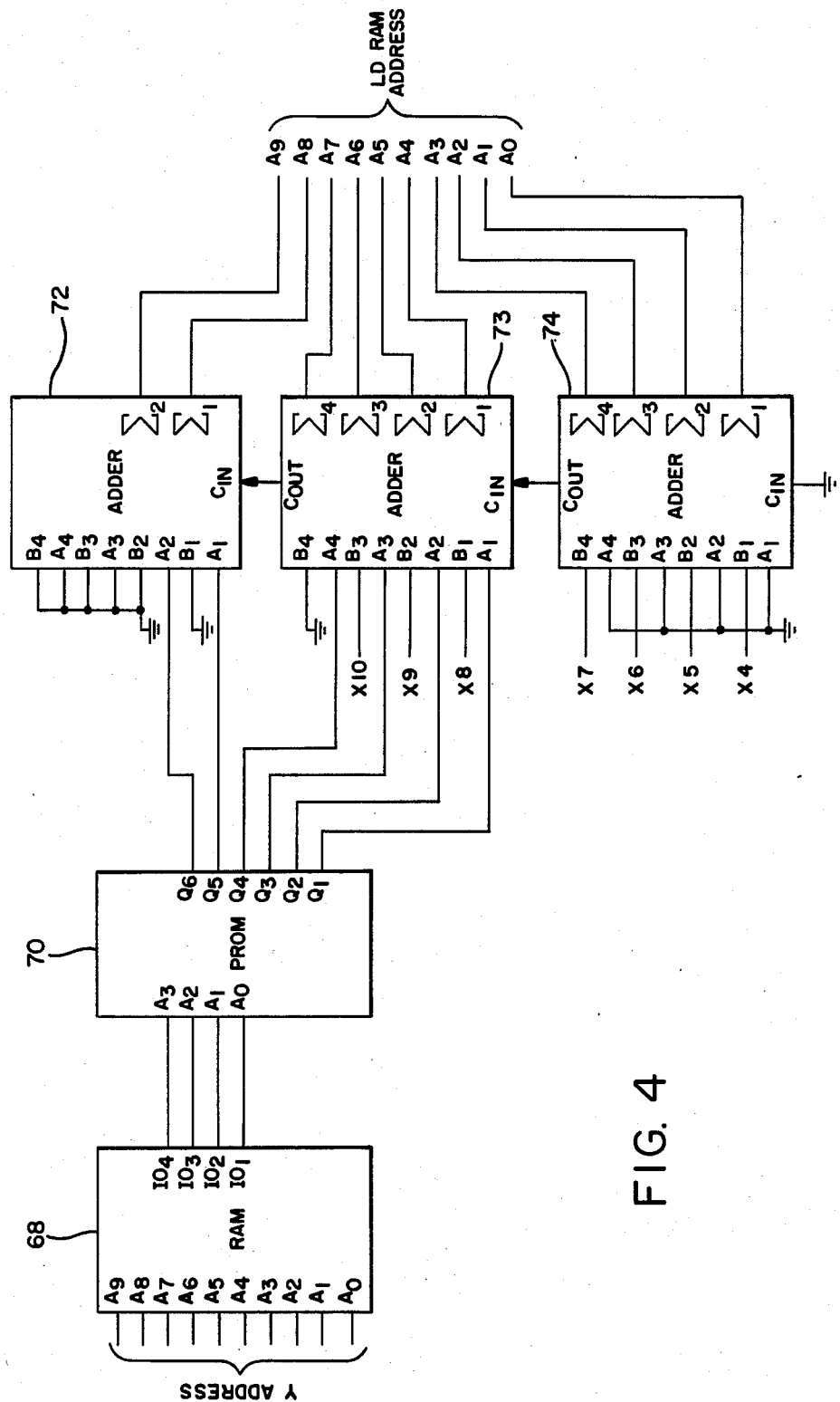
FIG. 4 is a logic-level diagram of the line definition signal selection portion and the line definition storage addressing portion of the embodiment of the invention.

An exemplary X address converter which may be used in the apparatus of the invention can be understood with reference to FIG. 4. A 10-bit Y address is provided to address inputs $A_0$–$A_9$ of a random-access memory 68, which corresponds in all respects to the LP RAM 50 of FIG. 3. Pointer codes, comprising 4-bit binary words, are provided as outputs on data ports $D_{IO}0$–$D_{IO}3$ of the RAM and are input into a programmable read-only memory (PROM) 70 containing a code which results in multiplication of the current line pointer code by 80 to obtain the first term of equation (1). The product is provided in binary digital format at output ports $Q_1$–$Q_6$ of PROM 70, with the binary significance of the output increasing from port $Q_1$ through port $Q_6$.

The output of the PROM 70 is fed to the array of binary adders 72–74 which are connected to provide a 10-bit binary digital output, $A_0$–$A_9$, which forms the LD RAM address. As the four least significant bits of the X address, that is, bits $X_0$–$X_3$, are not provided as inputs to the adder array, it is evident that the sum will increment at the frequency with which X address bit $X_4$ changes, that is once every 16 X addresses. Moreover, a constant of any selected value may be combined with address bits $X_4$–$X_7$ to provide a timing offset to accelerate or delay the production of the LD RAM address in order that it may be synchronized with the occurence of the next 16 X addresses. This may be desirable, for example, when a number of X CLOCK cycles necessary to shift the 16-bit segment through the P/S converter 58 to a point where it is serialized.

Figure 5:
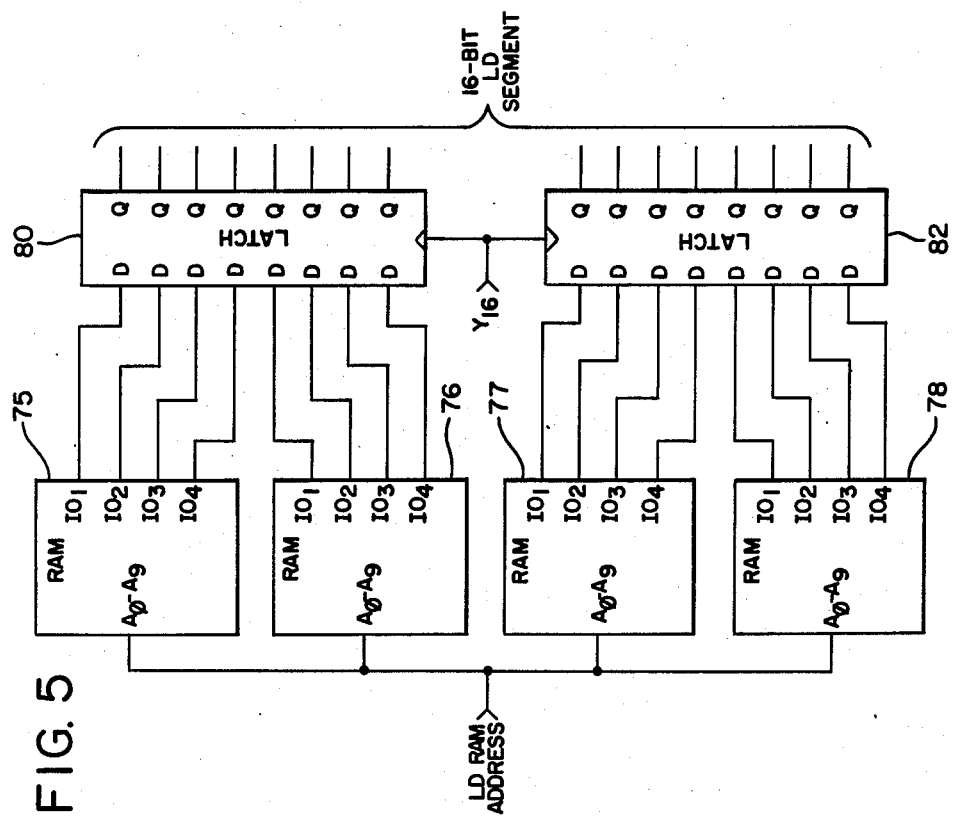
FIG. 5 is a logic-level diagram of the definition signal storage section of the embodiment of the invention.

The arrangement of parts of the LD RAM 56 and the associated interface circuitry can be better understood with reference to FIG. 5. The RAM 56 comprises a parallel array of four individual random-access memories 75–78, each of which comprises a 1K×4 device, whose address ports $A_0$–$A_9$ receive the LD RAM address which is provided by the X address converter 56 through the X multiplexer 54. The data ports of the RAMS 75 and 76 are connected to the D inputs of the octal latch circuit 80. The RAMS 77 and 78 are similarly coupled to the octal latch 82. The clock input to the latches 80 and 82 is synchronous with the frequency of change of the LD RAM address so that the currently-addressed 16-bit segment of a selected line definition signal is entered into the latches each time the address changes.

From the latches, the 16-bit line definition (LD) segment is coupled to the P/S converter 58, which can comprise any of a number of known circuits which have the capability of converting 16 parallel bits into a single serial bit stream.

In the practice of the invention, line definition signals may be produced by means which either are separate from or form a part of the cursor generation apparatus. Such a means can comprise the processor 62 illustrated in FIG. 3. In the production of line definition signals and associated pointer codes, the processor 62 receives, through its $D_{IO}$ terminal, information regarding desired cursor shape, size, and location from the cursor graphics entry devices of the graphics display system 46. The processor utilizes this information to compute the necessary line definition signals and their associated pointer codes for the operation described hereinabove.

After cursor information from the cursor control devices of the system 46 has first been received, or when it is thereafter updated, the processor 62 can calculate the required line definition signals and pointer codes according to a number of video line generation techniques, one of which is described hereinbelow. After the signals have been calculated, the processor enters the calculated definition signals and associated pointer codes into the respective RAMS. To enter a line definition pointer code in the LD RAM, the processor first transmits a command to the S port of Y multiplexer 49, causing its output to be switched to provide its A input. Another command signal is sent to port WR of the LP RAM 50, to permit pointer code information to be written thereinto. Then, the appropriate storage location of the LP RAM 40 is addressed and the appropriate pointer code entered through the buffer 64 in binary digital format. The order of data entry into the LP RAM storage table is illustrated by the storage Table 61 in FIG. 2. The control command is then removed from the LP RAM 50 and the output port of the Y multiplexer is switched back to its B input port.

When writing line definition signals into the LD RAM 56, another command is output by the processor 62 to port WR of the RAM to prepare it to receive the calculated line definition signal, and the output port of the X multiplexer is switched by a processor command to its A input port. Thereafter, the appropriate storage location in the LD RAM is addressed by the processor from its address port through the multiplexer 54, while at the same time the calculated line definition signal is provided through the processor's $D_{IO}$ port, through the buffer 66, into the RAM $D_{IO}$ terminal ports. Then, the control signal is removed from the WR port of the RAM, and the output port of the multiplexer 54 is switched back to its B input port so that the apparatus can operate as hereinabove described.

Figure 6:
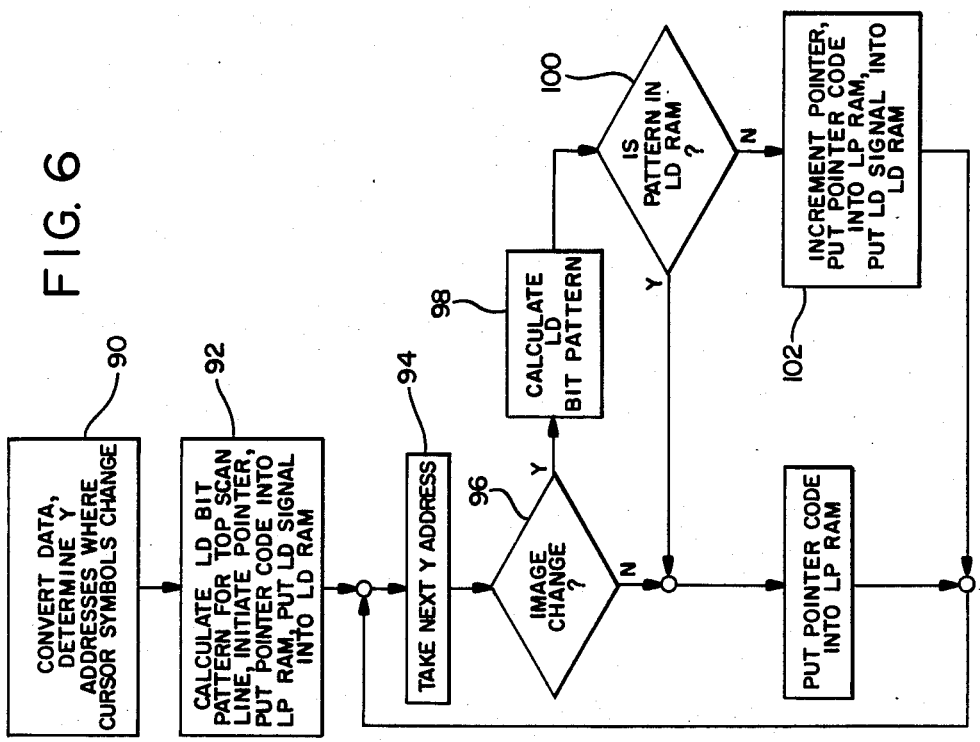
FIG. 6 is a simplified flow diagram illustrating how the line definition signals and line definition pointer signals of the invention are produced for storage.

FIG. 6 illustrates a method for calculating line definition signals and their associated pointer codes, and entering them into the appropriate RAMS. In the method, the Y addresses of the scan lines where the cursor image changes are determined and the line definition signals for those scan lines are calculated. In FIG. 2, cursor image changes occur at:

(1) the top scan line (Y=1,023);
(2) the scan line containing the top edge 38 of the rectangular cursor (Y=1,021);
(3) the scan line first intercepting the vertical edges 40 and 42 of the rectangular cursor and the vertical line 34 (Y=1,020);
(4) the scan line containing the horizontal crosshair line 44 (Y=1,018);
(5) the scan line below the vertical crosshair line 44 where the vertical edges 40 and 42 and the vertical cross hair line 34 are again intercepted (Y=1,017);
(6) the scan line containing the bottom horizontal edge 36 of the rectangular box (Y=1,016);
(7) the scan line immediately below the horizontal edge 36 where the vertical crosshair line 34 emerges from the rectangular box (Y=1,015);
(8) the scan line intersecting both the vertical crosshair line 34 and the alpha-numeric cursor 46 (Y=3);
(9) the scan line immediately below the alpha-numeric cursor 46 (Y=2); and
(10) the bottom of the screen (Y=0)

To calculate the line definition signals, a processor routine designed for this task accepts the information provided by the cursor graphics input devices and their associated hardware or firmware. This information includes cursor type, shape, dimensions and desired location. Such devices are known and may be understood with reference to known art such as that disclosed in the Doornink patent and the Model 4112 Manual cited above.

For example, in the case of a rectangular cursor, the location of the upper left-hand corner is given by the familiar (X, Y) coordinate notation where X is the pixel address and Y the scan line where the corner is located. In addition, the lengths of the horizontal and vertical edges can be given which is sufficient to locate the other three corners. Alternatively, all of the corner locations can be given which is sufficient to locate and properly dimension the symbol.

Using this coordinate information, a known linear algebra or coordinate translation routine may be employed to determine the Y addresses where the cursor images change. For just the rectangular cursor of the tableau illustrated in FIG. 2 these Y addresses are Y=1023, 1021, 1020, 1016, 1015 and 0. The listing always comprises the first and last scan lines as they form the upper and lower boundaries of the raster image containing the cursor symbols. Scan lines occurring therebetween which do not intersect a curso symbol will also be listed if they abut lines where symbols begin or terminate.

When the Y address of a scan line containing the image change location is calculated, the lateral boundary coordinates of each portion of a cursor which is contained therein can be obtained at the same time. For example, in FIG. 2, in the scan line containing the top edge of the rectangular cursor (Y=1021), the lefthand coordinate of the edge is (2,1021) while its opposite end is (15,1021). These two points are sufficient to locate the arrangement of bits in line definition type 1 which describes the edge (bit positions 2 through 15). The number of bits extending between those positions (13) can be calculated by subtracting the point coordinates. This establishes the pattern of the top edge 38. The bottom edge is similarly calculated.

The line definition signal defining the vertical edges of the rectangle is calculated by placing a 1 at each bit location corresponding to a corner, and by not filling the bit spaces therebetween. This is illustrated in line definition type 2 where 1's are placed in bit positions 2 and 15.

For generating line definition signals containing multiple cursor image portions, the processor routine performs the above-described process for each image portion represented. Thus, line definition type 2 also contains a 1 at bit position 5 to signify the vertical line 34.

When two cursor images occupy one or more line definition bit positions, for example, where the vertical line 34 crosses the upper edge 38, the line definition signal provides only a single 1 to indicate the presence of a cursor portion as is shown in bit position 5 of line definition signal type 1.

An exemplary procedure for systematically calculating the line definition signals of the invention is shown in FIG. 6.

In step 90, the processor receives and processes the cursor information provided from the cursor graphics input devices to identify the scan lines containing an image transition as described above. The scan lines are referred to by their associated Y addresses. In step 92 the processor identifies the top scan line (Y=1,023) and, using the cursor location and dimension information obtained by the cursor input devices, calculates the bit pattern of the line definition signal type 0, which is illustrated in FIG. 2. At the same time that the first line definition signal is calculated, the processor initiates a line definition signal pointer register by entering the code of the first line definition signal (0 in the example illustrated in FIG. 2). Then the pointer code in the pointer register and the calculated line definition signal are entered in the appropriate RAMS as described hereinabove.

Thereafter, taking each scan line address in sequence (step 94), the routine, at each address where the cursor image changes, will follow the positive exit from the decision block 96, calculate a line definition signal bit pattern (step 98) and compare the calculated pattern against those already stored in the LD RAM 56, as is shown in decision block 100. When the calculated pattern is not in the LD RAM, the negative exit is followed and the processor routine enters program step 102 where the pointer register is incremented, and the pointer code and calculated line definition signal are entered into their respective RAMS. In the event that the pattern calculated at program step 98 is contained in the LD RAM, then the positive exit from decision block 100 is taken and the pointer code associated with that pattern is entered into the LP RAM without incrementing the pointer register or entering the line definition signal into the LD RAM.

Finally, for those scan lines where no cursor image change occurs, the negative exit is followed from decision block 96, and the line pointer code of the last-calculated line definition signal is entered in the LP RAM at the current Y address.

While the foregoing represents one simple procedure for computing line definition signals, it is recognized that other routines might also be used and that selection and implementation of such a procedure would be routine for a person skilled in the art.

Although a variety of different devices might be utilized to implement the circuitry disclosed herein, or variations thereof, some specific devices which will work in the afore-described embodiment are listed in Table I hereof.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

TABLE I

| Item Numbers | Description | Source/Nomenclature |
| --- | --- | --- |
| 49,54 | Multiplexer | 74LS399 |
| 52 | Processor | Intel 8086 |
| 50,68,75–78 | 1K X4 Random-Access Memory | Intel 2148 |
| 64,66 | Octal Buffer | 74LS623 |
| 70 | Programmable Read-Only Memory | 74S288 |
| 72,73,74 | Binary Adder | 74LS283 |

What is claimed is:

1. An apparatus for generating cursors in a multidimensional display system, each dimension having a range of addresses corresponding to locations therein, said apparatus comprising:

(a) definition means for providing cursor definition signals for scan lines in a display, each cursor definition signal being representative of at least one location along a scan line in a first dimension where a cursor occurs;

(b) generation means responsive to a selected cursor definition signal from said definition means for generating a cursor video signal defining a line of a display where a cursor occurs; and (c) line definition pointer code means responsive to addresses in a second dimension for selecting the one of said cursor definition signals to which said generation means responds, the number of said cursor definition signals being less than the number of addresses in said second dimension such that more than one address in the second dimension selects the same cursor definition signal.

2. The apparatus of claim 1 wherein said generation means is responsive to a portion of said address in said first dimension.

3. The apparatus of claim 1 wherein said display system produces a raster-scan image comprising a plurality of sequentially occurring scan lines extending in the direction of said first dimension, and wherein each scan line is associated with a respective address in said second dimension.

4. The apparatus of claim 1 wherein said definition means comprises definition memory means for receiving and storing definition signals to be selected.

5. The apparatus of claim 4, further comprising programmable processor means, coupled to said definition memory means, for producing definition signals to be stored and causing them to be stored in said definition memory means.

6. The apparatus of claim 1 wherein said line definition pointer code means comprises pointer memory means for receiving and storing pointing data which associates at least one address in said second dimension with a respective cursor definition signal.

7. The apparatus of claim 6, further comprising programmable processor means, coupled to said pointer memory means, for producing pointing data to be stored in said pointer memory means.

8. The apparatus of claim 7 wherein said definition means comprises definition memory means for receiving and storing cursor definition signals to be selected, said programmable processor means being coupled to said definition memory means for producing cursor definition signals and causing them to be stored in said definition memory means.

9. The apparatus of claim 8 wherein said generation means is responsive to a portion of said address in said first dimension.

10. The apparatus of claim 8 wherein said definition memory means comprises one or more random-access memory devices, each having a plurality of storage locations with corresponding storage addresses, and wherein said generating means includes storage addressing means asssociated with said memory devices for accessing said data storage locations in response to said line definition pointer code means and to said addresses in said first dimension.

11. The apparatus of claim 10 wherein said pointing data and said addresses in said first dimension are binary digital quantitites, and wherein said storage addressing means includes means responsive to said pointing data for providing a predetermined multiple thereof and means for combining said predetermined multiple with predetermined most significant bits of an address in said first dimension to obtain a storage address.

12. A method for generating cursors in a multidimentional display system, each said dimension having a range of addresses corresponding to locations therein, comprising:
   (a) providing cursor definition signals for scan lines in a display, each cursor definition signal being representative of at least one location along a scan line in a first dimension where a cursor occurs;
   (b) generating a cursor video signal defining a line of a display where a cursor occurs in response to a selected cursor definition signal; and
   (c) selecting the one of said cursor definition signals to which said generation of a cursor video signal is responsive in accordance with addresses in a second dimension wherein different addresses each select a cursor definition signal, the number of said cursor definition signals being less than the number of addresses in said second dimension such that more than one address in the second dimension selects the same cursor definition signal.

13. An apparatus for generating multiple cursors in a multidimensional display system, each said dimension having a range of addresses corresponding to locations therein, said apparatus comprising:
   (a) means for generating cursor definition signals for unique cursor patterns; said cursor definition signals being generated on scan lines as addressed along a first dimension;
   (b) first storage means for storing said cursor definition signals;
   (c) means for generating a line definition pointer code for each scan line; each of said line definition pointer codes addressing an associated cursor definition signal; each of said line definition pointer codes being associated with an address along a second dimension; the number of cursor definition signals being less than the number of addresses in said second dimension such that at least one of said cursor definition signals is associated with more than one address along said second dimension;
   (d) second storage means for storage said line definition pointer codes; and
   (e) means for processing cursor definition signal data such that the line definition pointer code for each scan line addresses said first storage means to select a said cursor definition signal, and wherein a cursor video signal is generated when an address in said first dimension corresponds to a cursor definition signal addressed in said first storage means by a said line definition pointer code, at least one of said cursor definition signals representing portions of plural cursor patterns and selected by a line definition pointer code corresponding to plural addresses in said second dimension.

* * * * *